United States Patent
Akiyama et al.

(10) Patent No.: US 9,500,941 B2
(45) Date of Patent: Nov. 22, 2016

(54) ILLUMINATION DEVICE AND PROJECTOR

(71) Applicant: SEIKO EPSON CORPORATION, Tokyo (JP)

(72) Inventors: Koichi Akiyama, Matsumoto (JP); Akihiro Kashiwagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 54 days.

(21) Appl. No.: 14/684,817

(22) Filed: Apr. 13, 2015

(65) Prior Publication Data
US 2015/0301438 A1 Oct. 22, 2015

(30) Foreign Application Priority Data

Apr. 16, 2014 (JP) ................................. 2014-084815
Feb. 4, 2015 (JP) ................................. 2015-020256

(51) Int. Cl.
G03B 21/20 (2006.01)
G02B 27/48 (2006.01)
G02B 27/28 (2006.01)

(52) U.S. Cl.
CPC ........... *G03B 21/208* (2013.01); *G02B 27/283* (2013.01); *G02B 27/48* (2013.01); *G03B 21/204* (2013.01); *G03B 21/2033* (2013.01); *G03B 21/2066* (2013.01); *G03B 21/2073* (2013.01)

(58) Field of Classification Search
CPC .... G03B 21/28; G03B 21/204; G03B 21/2066; G03B 21/2073; G02F 2001/133541; G02F 2001/133543; G02F 2001/133638; G02F 1/13363; G02F 1/133528; G02F 1/133536
See application file for complete search history.

(56) References Cited

U.S. PATENT DOCUMENTS

| 2008/0187012 | A1 | 8/2008 | Yamauchi et al. | |
| 2011/0310363 | A1* | 12/2011 | Kita | G03B 21/204 353/98 |
| 2012/0133903 | A1 | 5/2012 | Tanaka | |
| 2012/0140183 | A1 | 6/2012 | Tanaka et al. | |
| 2012/0229780 | A1 | 9/2012 | Sato | |
| 2013/0121018 | A1* | 5/2013 | Sasaki | G02B 5/02 362/602 |
| 2013/0229628 | A1 | 9/2013 | Akiyama et al. | |
| 2014/0240676 | A1* | 8/2014 | Maes | G03B 21/204 353/20 |

FOREIGN PATENT DOCUMENTS

| CN | 203217230 U | 9/2013 |
| JP | 2003-167106 A | 6/2003 |
| JP | 2004-325469 A | 11/2004 |
| JP | 2005-215396 A | 8/2005 |
| JP | 2005-215642 A | 8/2005 |

(Continued)

Primary Examiner — Sultan Chowdhury
(74) Attorney, Agent, or Firm — Oliff PLC

(57) ABSTRACT

An illumination device includes a light source device adapted to emit a third light beam including a first component in a first polarization state, a polarization separation element to which the third light beam is input, a retardation element, and a diffusely reflecting element having a concavo-convex structure including a plurality of curved surfaces. The first component having passed through the retardation element via the polarization separation element, is then reflected by the diffusely reflecting element, then passed through the retardation element again, and then enters the polarization separation element. Thus, the fourth component in the second polarization state out of the first component is emitted from the illumination device via the polarization separation element.

20 Claims, 8 Drawing Sheets

(56) References Cited

FOREIGN PATENT DOCUMENTS

| JP | 2006-215115 A | 8/2006 |
|----|---------------|--------|
| JP | 2007-256826 A | 10/2007 |
| JP | 2008-158512 A | 7/2008 |
| JP | 2011-128522 A | 6/2011 |
| JP | 2012-133337 A | 7/2012 |
| JP | 2012-137744 A | 7/2012 |
| JP | 2012-185369 A | 9/2012 |
| JP | 2013-182207 A | 9/2013 |
| JP | 2013-250494 A | 12/2013 |

* cited by examiner

ILLUMINATION DEVICE AND PROJECTOR

BACKGROUND

1. Technical Field

The present invention relates to an illumination device and a projector.

2. Related Art

There has been known an illumination device provided with a solid-state light source such as a semiconductor laser and a phosphor layer for generating fluorescence using light emitted from the solid-state light source as excitation light. In JP-A-2013-250494, for example, there is disclosed a light source device provided with a semiconductor laser source, a light separation element, a fluorescent element, a first reflecting element, a quarter-wave plate, a diffuser plate, and a second reflecting element.

In this light source device, the excitation light emitted from the semiconductor laser source enters the light separation element, and is separated into two light beams by the light separation element having a polarization separation property. The fluorescent element is irradiated with one of the light beams separated from by the light separation element as the excitation light, and thus the fluorescence is emitted. The fluorescence is reflected by the first reflecting element toward the light separation element, and is then emitted to the outside via the light separation element. The other of the light beams separated by the light separation element is adjusted by the quarter-wave plate in the polarization state, and is then diffused by the diffuser plate in the state in which the polarization is maintained, and at the same time, reflected by the second reflecting element toward the light separation element via the quarter-wave plate, and then emitted to the outside via the light separation element.

In the light source device of JP-A-2013-250494, the light beam, with which the phosphor layer is not irradiated, and which is emitted to the outside, out of the light beams emitted from the solid-state light source is diffused by the diffuser plate for the purpose of homogenizing the illuminance distribution and at the same time resolving the speckle noise. In order to make use of the diffused light with high efficiency, for example, when right circularly polarized light is diffusely reflected by the diffuser plate and the reflecting plate, it is necessary for the right circularly polarized light to be converted into left circularly polarized light. However, if the diffusion angle of the light by the diffuser plate is increased, the polarization retention rate drops. If the polarization retention rate drops, the amount of the light to be emitted to the outside via the light separation element decreases. In other words, the efficiency of the diffused light drops. Therefore, in order to obtain the polarization retention rate equal to or higher than 95%, the diffusion angle is set to be equal to or smaller than 13°. However, at this level, diffusion of the light is not sufficient, and the effect of homogenizing the illuminance distribution and the effect of remediating the speckle noise cannot sufficiently be obtained.

Further, the configuration for setting the diffusion angle of the diffuser plate to be equal to or smaller than 13° is not specifically described. If the diffusion angle of the diffuser plate is too small, there is a problem that color unevenness occurs due to an increase in the difference between the diffusion angle of the blue light and the diffusion angle of the yellow light. Therefore, the diffusion angle of the diffusely reflecting element needs to appropriately be set.

SUMMARY

An advantage of some aspects of the invention is to provide an illumination device in which the homogenization of the illuminance distribution and the remediation of the speckle noise are achieved while suppressing the degradation of the light efficiency. Another advantage of some aspects of the invention is to realize a projector high in display quality by providing the illumination device described above to the projector.

An illumination device according to an aspect of the invention includes a light source device adapted to emit a third light beam including a first component in a first polarization state, a polarization separation element to which the third light beam is input, a retardation element to which the first component is input via the polarization separation element, and a diffusely reflecting element having a concavo-convex structure including a plurality of curved surfaces, the diffusely reflecting element receiving the first component that has passed through the retardation element whereby polarization state of the first component is changed, and a fourth component in a second polarization state different from the first polarization state out of the first component, which has been reflected by the diffusely reflecting element, and then passed through the retardation element, is emitted via the polarization separation element.

According to the configuration described above, the first component included in the third light beam having been emitted from the light source device enters the diffusely reflecting element via the polarization separation element and the retardation element, and is then diffusely reflected by the diffusely reflecting element, and is then emitted from the illumination device via the retardation element and the polarization separation element again. Since the diffusely reflecting element has the concavo-convex structure including the plurality of curved surfaces, the disturbance of the polarization state when the first component is reflected by the diffusely reflecting element can be suppressed, and at the same time, the diffusion angle can be increased. Thus, it is possible to realize the illumination device capable of homogenization of the illuminance distribution and remediation of the speckle noise while suppressing the degradation of the efficiency of the first component.

In the illumination device according to the aspect of the invention, the plurality of curved surfaces may be randomly arranged in a planar view.

According to this configuration, the effect of homogenizing the illuminance distribution and the effect of remediating the speckle noise can be enhanced compared to the case in which the plurality of curved surfaces is arranged regularly.

In the illumination device according to the aspect of the invention, the diffusely reflecting element may have the concavo-convex structure on a surface on a side to which the first component is input, and the concavo-convex structure may have reflectivity.

According to this configuration, unlike the case in which, for example, the reflection occurs on the surface on the opposite side to the side to which the first component is input, the light loss by the diffusely reflecting element is small in amount, and thus the light efficiency can be enhanced.

In the illumination device according to the aspect of the invention, a metal reflecting film may be disposed on the surface of the concavo-convex structure.

According to this configuration, the reflection characteristic is difficult to be degraded even in the case in which the incident angle of the light changes compared to the case of using, for example, the reflecting film formed of the dielectric multilayer film. As a result, the light loss due to the diffusely reflecting element decreases, and the efficiency of the light can be improved.

In the illumination device according to the aspect of the invention, the concavo-convex structure may be configured so that a light intensity of the fourth component having been emitted via the polarization separation element is one of equal to and higher than 75% of the light intensity obtained in a case of replacing the diffusely reflecting element with a reflecting element having a flat reflecting surface.

The inventors conducted a study for the correlative relationship between the shape of the concavo-convex structure and the light efficiency by changing the shape of the concavo-convex structure of the diffusely reflecting element. In the present specification, the light efficiency denotes the ratio between the light intensity of the fourth component emitted via the polarization separation element and the light intensity obtained in the case of replacing the diffusely reflecting element with the reflecting element having a flat reflecting surface (i.e., the reflecting element with which the polarization state of the linearly-polarized light having perpendicularly entered the reflecting element is completely maintained). According to the result of the study of the inventors, it was understood that in the area in which the value of the ratio was equal to or higher than 75%, the value of the ratio varied gently with respect to the variation in shape of the concavo-convex structure, and in contrast, in the area in which the value of the ratio was lower than 75%, the value of the ratio varied rapidly. In the illumination device according to the aspect of the invention, since the concavo-convex structure is configured so that the light intensity of the fourth component having been emitted via the polarization separation element is one of equal to and higher than 75% of the light intensity obtained in the case of replacing the diffusely reflecting element with a reflecting element having a flat reflecting surface, the light efficiency can be maintained within an appropriate range.

In the illumination device according to the aspect of the invention, the third light beam may include a second component in the second polarization state, the polarization separation element may transmit a light beam with a wavelength different from a wavelength of the third light beam irrespective of a polarization state of the light beam, and the illumination device further may include a phosphor layer to which the second component, which has been emitted from the light source device, and then reflected by the polarization separation element, is input, and a reflecting section disposed on an opposite side of the phosphor layer to the surface to which the second component is input, and adapted to reflect light generated by the phosphor layer.

According to the configuration described above, the second component included in the third light is reflected by the polarization separation element, and then enters the phosphor layer to excite the fluorescent material. The light generated by the phosphor layer and the light beam diffusely reflected by the diffusely reflecting element are combined with each other by the polarization separation element, and then the composite light is emitted from the illumination device. In such a manner as described above, the illumination light including the fluorescence and the diffusion light beam combined with each other is obtained.

In the illumination device according to the aspect of the invention, the third light beam may include a second component in the second polarization state, the polarization separation element may reflect a light beam with a wavelength different from a wavelength of the third light beam irrespective of a polarization state of the light beam, and the illumination device may further include a phosphor layer to which the second component, which has been emitted from the light source device, and then transmitted through the polarization separation element, is input, and a reflecting section disposed on an opposite side of the phosphor layer to the surface to which the second component is input, and adapted to reflect light generated by the phosphor layer.

According to the configuration described above, the second component included in the third light is transmitted through the polarization separation element, and then enters the phosphor layer to excite the fluorescent material. The light generated by the phosphor layer and the light beam diffusely reflected by the diffusely reflecting element are combined with each other by the polarization separation element, and then the composite light is emitted from the illumination device. In such a manner as described above, the illumination light including the fluorescence and the diffusion light beam combined with each other is obtained.

In the illumination device according to the aspect of the invention, assuming that color unevenness in an illumination target area in a case of replacing the diffusely reflecting element with the reflecting element is reference color unevenness, the concavo-convex structure may be configured so that the color unevenness is one of equal to and lower than 90% of the reference color unevenness.

According to the result of the study of the inventors, it was understood that in the case in which the color unevenness in the illumination target area was equal to or lower than 90% of the color unevenness obtained in the case of replacing the diffusely reflecting element with the reflecting element having the flat reflecting surface, the color unevenness could hardly be recognized. The details thereof will be described later.

In the illumination device according to the aspect of the invention, the concavo-convex structure may be configured so that the color unevenness is one of equal to and lower than 50% of the reference color unevenness. In this case, it is preferable that an aspect ratio of the concavo-convex structure is one of equal to and higher than 0.002.

According to the result of the study of the inventors, it was understood that in the case in which the condition described above was satisfied, the state low in color unevenness could stably be maintained. The details thereof will be described later.

In the illumination device according to the aspect of the invention, the diffusely reflecting element may be disposed rotatably in a plane intersecting with a center axis of the first component entering the diffusely reflecting element.

According to this configuration, since the irradiation position with the first component on the diffusely reflecting element varies with time, the damage of the diffusely reflecting element due to the irradiation with the first component can be reduced. Further, since the concavo-convex structure located on the light path of the first component varies with time, the effect of the homogenization of the illuminance distribution and the effect of the remediation of the speckle noise can further be enhanced.

In the illumination device according to the aspect of the invention, the concavo-convex structure may have a shape of causing no multiple reflection.

According to this configuration, the polarization retention rate in the diffusely reflecting element can more surely be increased.

A projector according to another aspect of the invention includes the illumination device according to the aspect of the invention, a light modulation device adapted to modulate light emitted from the illumination device in accordance with image information to thereby form image light, and a projection optical system adapted to project the image light.

According to this configuration, since the illumination device according to the aspect of the invention is provided, the projector high in display quality can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained using FIGS. 1, 2, 3A, 3B, 3C, and 4.

The projector according to the present embodiment is an example of a liquid crystal projector equipped with an illumination device using a semiconductor laser.

The drawings used in the following explanation may sometimes be partially enlarged views for making the characteristic part eye-friendly, and thus, the dimensional ratios between the constituents and so on are not necessarily the same as actual ones.

Projector

Firstly, an example of the projector 1 shown in FIG. 1 will be explained.

Figure 1:
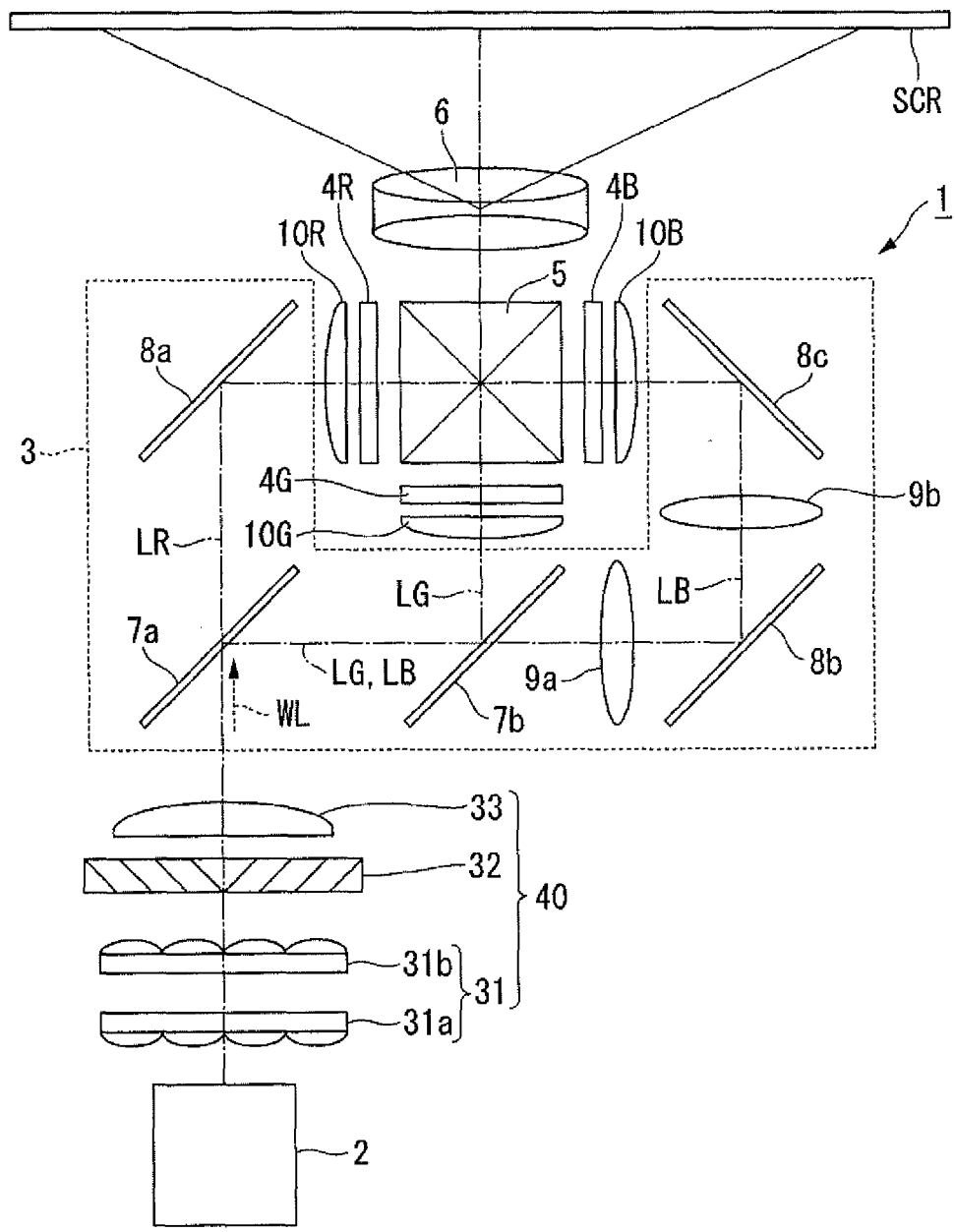
FIG. 1 is a diagram showing a schematic configuration of a projector according to a first embodiment of the invention.

FIG. 1 is a plan view showing a schematic configuration of the projector 1.

The projector 1 according to the present embodiment is a projection-type image display device for displaying a color picture (an image) on a screen (a projection target surface) SCR. The projector 1 uses three light modulation devices corresponding respectively to colored light beams, namely a red light beam LR, a green light beam LG, a blue light beam LB. The projector 1 uses semiconductor lasers (laser sources), with which high-intensity and high-power light can be obtained, as light sources of an illumination device.

Specifically, as shown in FIG. 1, the projector 1 is schematically provided with the illumination device 2, a homogenous illumination optical system 40, a color separation optical system 3, a light modulation device 4R, a light modulation device 4G, a light modulation device 4B, a combining optical system 5, and a projection optical system 6.

The illumination device 2 emits an illumination light beam WL toward the homogenous illumination optical system 40. As the illumination device 2, there is used the illumination device to which the aspect of the invention described later is applied.

The homogenous illumination optical system 40 is provided with an integrator optical system 31, a polarization conversion element 32, and an overlapping optical system 33. The homogenous illumination optical system 40 homogenizes the intensity distribution of the illumination light beam WL emitted from the illumination device 2 in an illumination target area. The illumination light beam WL having been emitted from the homogenous illumination optical system 40 enters the color separation optical system 3.

The color separation optical system 3 is for separating the illumination light beam WL having a white color into the red light beam LR, the green light beam LG, and the blue light beam LB. The color separation optical system 3 is schematically provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a has a function of separating the illumination light beam WL from the illumination device 2 into the red light beam LR and the other light beams (the green light beam and the blue light beam). The first dichroic mirror 7a transmits the red light beam LR thus separated from, and at the same time reflects the other light beams (the green light beam LG and the blue light beam LB). In contrast, the second dichroic mirror 7b has a function of separating the other light beams into the green light beam LG and the blue light beam LB. The second dichroic mirror 7b reflects the green light beam LG thus separated from, while transmitting the blue light beam LB.

The first total reflection mirror 8a is disposed in the light path of the red light beam LR to reflect the red light beam LR, which has been transmitted through the first dichroic mirror 7a, toward the light modulation device 4R. Meanwhile, the second total reflection mirror 8b and the third total reflection mirror 8c are disposed in the light path of the blue light beam LB to reflect the blue light beam LB, which has been transmitted through the second dichroic mirror 7b, toward the light modulation device 4B. It should be noted that it is not necessary to dispose a total reflection mirror in the light path of the green light beam LG, and the green light beam LG is reflected by the second dichroic mirror 7b toward the light modulation device 4G.

The first relay lens 9a and the second relay lens 9b are disposed on the light emission side of the second dichroic mirror 7b in the light path of the blue light beam LB. The first relay lens 9a and the second relay lens 9b have a function of compensating the optical loss of the blue light beam LB due to the fact that the optical path length of the blue light LB becomes longer than the optical path lengths of the red light beam LR and the green light beam LG.

The light modulation device 4R modulates the red light beam LR in accordance with image information to form a red image light beam while transmitting the red light beam LR. The light modulation device 4G modulates the green light beam LG in accordance with the image information to form a green image light beam while transmitting the green light beam LG. The light modulation device 4B modulates the blue light beam LB in accordance with the image information to form a blue image light beam while transmitting the blue light beam LB.

As the light modulation devices 4R, 4G, and 4B, there are used, for example, transmissive liquid crystal panels. Further, in the entrance side and the exit side of each of the liquid crystal panels, there are disposed polarization plates (not shown), respectively.

On the entrance side of the light modulation devices 4R, 4G, and 4B, the field lenses 10R, 10G, and 10B are disposed, respectively. The field lenses 10R, 10G, and 10B are for collimating the red light beam LR, the green light beam LG, and the blue light beam LB entering the light modulation devices 4R, 4G, and 9B, respectively.

To the combining optical system 5, there are input the image light beams from the light modulation devices 4R, 4G, and 4B. The combining optical system 5 combines the image light beams having entered the combining optical system 5, and then emits the image light beam thus combined toward the projection optical system 6. As the combining optical system 5, there is used, for example, a cross dichroic prism.

The projection optical system 6 is formed of a projection lens group. The projection optical system 6 projects the image light beam combined by the combining optical system 5 toward the screen SCR in an enlarged manner. Thus, a color picture (image) thus enlarged is displayed on the screen SCR.

Illumination Device

Then, a specific example of the illumination device according to the embodiment, to which the aspect of the invention is applied, used for an illumination device 2 will be explained.

An illumination device 20A shown in FIG. 2 will be explained.

Figure 2:
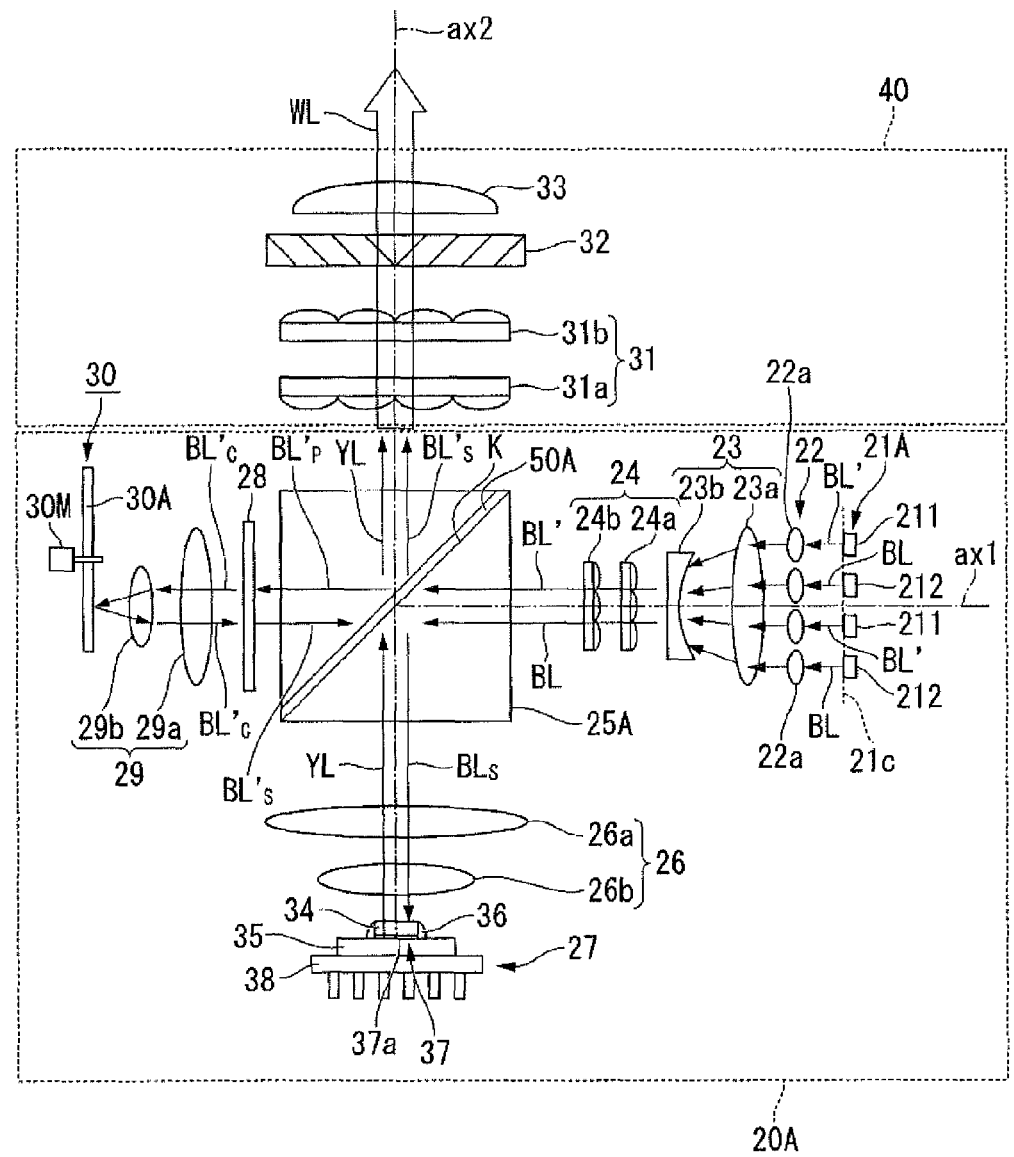
FIG. 2 is a plan view showing a general configuration of an illumination device according to the first embodiment.

FIG. 2 is a plan view showing a schematic configuration of the illumination device 20A.

As shown in FIG. 2, the illumination device 20A is schematically provided with an array light source 21A, a collimator optical system 22, an afocal optical system 23, a homogenizer optical system 24, an optical element 25A including a polarization separation element 50A, a first pickup optical system 26, a fluorescence emitting element 27, a retardation plate 28, a second pickup optical system 29, and a diffusely reflecting element 30.

The diffusely reflecting element 30 according to the present embodiment corresponds to a diffusely reflecting element in the appended claims. The polarization separation element 50A according to the present embodiment corresponds to a polarization separation element in the appended claims. The retardation plate 28 according to the present embodiment corresponds to a retardation element in the appended claims.

The array light source (the light source device) 21A, the collimator optical system 22, the afocal optical system 23, the homogenizer optical system 24, the optical element 25A, the retardation plate 28, the second pickup optical system 29, and the diffusely reflecting element 30 are disposed on the optical axis ax1 sequentially side by side. The fluorescence emitting element 27, the first pickup optical system 26, and the optical element 25A are disposed on the optical axis ax2 sequentially side by side. The optical axis ax1 and the optical axis ax2 are located in the same plane, and have a positional relationship of being perpendicular to each other.

The array light source 21A corresponds to a light source device according to the invention. The array light source 21A is provided with first semiconductor lasers 211 as first light sources, and second semiconductor lasers 212 as second light sources. The plurality of first semiconductor lasers 211 and the plurality of second semiconductor lasers 212 are arranged side by side in an array in the same plane perpendicular to the optical axis ax1.

The first semiconductor lasers 211 each emit the blue light beam BL' as a first light beam in a first wavelength band. The first light beam corresponds to a first component in the appended claims. The first semiconductor lasers 211 each emit, for example, the laser beam with a peak wavelength of 460 nm as the blue light beam BL'. The second semiconductor lasers 212 are each a laser source for the excitation light beam for emitting the excitation light beam BL as a second light beam in a second wavelength band. The second light beam corresponds to a second component in the appended claims. The second semiconductor lasers 212 each emit, for example, the laser beam with a peak wavelength of 446 nm as the excitation light beam BL.

The excitation light beams BL and the blue light beams BL' are emitted from the array light source 21A toward the polarization separation element 50A.

The excitation light beams BL and the blue light beams BL' having been emitted from the array light source 21A enter the collimator optical system 22. The collimator optical system 22 is for converting the excitation light beams BL and the blue light beams BL' having been emitted from the array light source 21A into parallel light beams. The collimator optical system 22 is formed of, for example, a plurality of collimator lenses 22a arranged side by side in an array. The collimator lenses 22a are disposed corresponding respectively to the first semiconductor lasers 211 and the second semiconductor lasers 212.

The excitation light beams BL and the blue light beams BL', each of which has been converted into the parallel light beam by passing through the collimator optical system 22, enter the afocal optical system 23. The afocal optical system 23 is for adjusting the light beam diameter of the excitation light beams BL and the blue light beams BL'. The afocal optical system 23 is formed of, for example, afocal lenses 23a, 23b.

The excitation light beams BL and the blue light beams BL', which have been adjusted in the light beam diameter by passing through the afocal optical system 23, enter the homogenizer optical system 24. The homogenizer optical system 24 is for converting the light intensity distribution of the excitation light beams BL and the blue light beams BL' into a homogenized state (a so-called top-hat distribution). The homogenizer optical system 24 is formed of, for example, multi-lens arrays 24a, 24b.

The excitation light beams BL and the blue light beams BL' having the light intensity distributions, which have been converted into the homogenized state by the homogenizer optical system 24, enter the optical element 25A. The optical element 25A is formed of, for example, a dichroic prism having wavelength selectivity. The dichroic prism has a tilted surface K having an angle of 45° with the optical axis ax1. The tilted surface K also has an angle of 45° with the optical axis ax2. The optical element 25A is disposed so that the intersection between the optical axes ax1, ax2 perpendicular to each other and the optical center of the tilted surface K coincide with each other. It should be noted that the optical element 25A is not limited to one having a prismatic shape such as a dichroic prism, but a dichroic mirror having a parallel-plate shape can also be used.

The tilted surface K is provided with a polarization separation element 50A having wavelength selectivity. The polarization separation element 50A has a polarization separation function of separating the excitation light beams BL and the blue light beams BL' into an S-polarized light component (one polarized light component, or a component in a second polarization state) and a P-polarized light component (the other polarized light component, or a component in a first polarization state) with respect to the polarization separation element 50A. Specifically, the polarization separation element 50A reflects the S-polarized light component of the excitation light beams BL and the S-polarized light component of the blue light beams BL', and transmits the P-polarized light component of the excitation light beams BL and the P-polarized light component of the blue light beams BL'.

Further, the polarization separation element 50A has a color separation function of transmitting fluorescence YL described later different in wavelength band from the excitation light beams BL and the blue light beams BL' irrespective of the polarization state.

Here, the excitation light beams BL and the blue light beams BL' are each a coherent linearly polarized light beam. Further, the excitation light beams BL and the blue light beams BL' are different from each other in polarization direction in entering the polarization separation element 50A.

Specifically, the polarization direction of the excitation light beams BL coincides with the polarization direction of one polarized light component (e.g., the S-polarized light component) reflected by the polarization separation element 50A. In contrast, the polarization direction of the blue light beams BL' coincides with the polarization direction of the other polarized light component (e.g., the P-polarized light component) transmitted through the polarization separation element 50A. As described above, in entering the polarization separation element 50A, the polarization direction of the excitation light beams BL and the polarization direction of the blue light beams BL' are perpendicular to each other. In order to realize this configuration, it is sufficient to dispose the first semiconductor lasers 211 and the second semiconductor lasers 212 so that the polarization direction of the blue light beams BL' when emitted from the first semiconductor lasers 211 is perpendicular to the polarization direction of the excitation light beams BL when emitted from the second semiconductor lasers 212.

Therefore, the excitation light beams BL having entered the polarization separation element 50A have the polarization direction coinciding with the polarization direction of the S-polarized light component, and are therefore reflected as the S-polarized excitation light beams $BL_S$ toward the fluorescence emitting element 27. In contrast, the blue light beams BL' having entered the polarization separation element 50A have the polarization direction coinciding with the polarization direction of the P-polarized light component, and are therefore transmitted as the P-polarized blue light beams $BL'_P$ toward the diffusely reflecting element 30.

Here, the case in which the polarization direction of the excitation light beams BL is the same as the polarization direction of the blue light beams BL' in entering the polarization separation element 50A will be considered. In this case, since the blue light beams BL' are P-polarized light beams, the excitation light beams BL are also P-polarized light beams. In order to make the polarization separation element 50A reflect the P-polarized excitation light beams BL, it is required for the polarization separation element 50A to have the polarization separation function with respect to the blue light beams BL' with a peak wavelength of 460 nm, but not to have the polarization separation function with respect to the excitation light beams BL with a peak wavelength of 446 nm. However, it is difficult to manufacture the polarization separation element having such a characteristic.

In contrast, in the present embodiment, the excitation light beams BL are each an S-polarized light beam, and the blue light beams BL' are each a P-polarized light beam. In this case, it is possible for the polarization separation element 50A to have the polarization separation function with respect not only to the blue light beams BL' with a peak wavelength of 460 nm, but also to the excitation light beams BL with a peak wavelength of 446 nm. Therefore, the polarization separation element can easily be manufactured.

The S-polarized excitation light beams $BL_S$ having been emitted from the polarization separation element 50A enter the first pickup optical system 26. The first pickup optical system 26 is for converging the excitation light beams $BL_S$ toward a phosphor layer 34 of the fluorescence emitting element 27. The first pickup optical system 26 is formed of, for example, pickup lenses 26a, 26b.

The excitation light beams $BL_S$ having been emitted from the first pickup optical system 26 enter the fluorescence emitting element 27. The fluorescence emitting element 27 has the phosphor layer 34, a substrate 35 for supporting the phosphor layer 34, and a fixation member 36 for fixing the phosphor layer 34 to the substrate 35.

In the fluorescence emitting element 27, the phosphor layer 34 is fixedly supported by the substrate 35 with the fixation member 36 disposed between a side surface of the phosphor layer 34 and the substrate 35 in the state of making a surface of the phosphor layer 34 have contact with the substrate 35, wherein the surface of the phosphor layer 34 is on the opposite side to the side to which the excitation light beams $BL_S$ are input.

The phosphor layer 34 includes a fluorescent material to be excited when absorbing the excitation light beams $BL_S$ with a wavelength of 446 nm. The fluorescent material excited by the excitation light beams $BL_S$ generates fluorescence (a yellow light beam) YL having a peak wavelength in a wavelength band of, for example, 500 through 700 nm.

As the phosphor layer 34, a material superior in heat resistance and surface workability is preferably used. As such a phosphor layer 34, a phosphor layer obtained by dispersing phosphor particles in an inorganic binder such as alumina, or a phosphor layer obtained by sintering the phosphor particles without using the binder, for example, can preferably be used.

On the opposite side of the phosphor layer 34 to the side to which the excitation light beams $BL_S$ are input, there is disposed a reflecting section 37. The reflecting section 37 has a function of reflecting a part of the fluorescence YL generated by the phosphor layer 34.

The reflecting section 37 according to the present embodiment corresponds to a reflecting section in the appended claims.

The reflecting section 37 is preferably formed of a specular surface. In the fluorescence emitting element 27, since the reflecting section 37 specularly reflects the fluorescence YL generated by the phosphor layer 34, the fluorescence YL can efficiently be emitted from the phosphor layer 34.

Specifically, the reflecting section 37 can be configured by disposing a reflecting film 37a on a surface of the phosphor layer 34 on the side opposite to the side to which the excitation light beams $BL_S$ are input. In this case, the surface of the reflecting film 37a opposed to the phosphor layer 34 forms the specular surface. The reflecting section 37 can also be realized by a configuration in which the substrate 35 is formed of a base material having a light reflective property. In this case, by eliminating the reflecting film 37a, and making a surface of the substrate 35 opposed to the phosphor layer 34 specular, the surface can be used as the specular surface.

It is preferable to use an inorganic adhesive having a light reflective property as the fixation member 36. In this case, the light leaked from the side surface of the phosphor layer 34 can be reflected toward the inside of the phosphor layer 34 by the inorganic adhesive having the light reflective property. Thus, it is possible to further improve the light extraction efficiency of the fluorescence YL generated by the phosphor layer 34.

On a surface of the substrate 35 opposite to the surface for supporting the phosphor layer 34, there is disposed a heatsink 38. In the fluorescence emitting element 27, heat radiation can be achieved through the heatsink 38, the heat deterioration of the phosphor layer 34 can be prevented.

The part of the fluorescence YL generated by the phosphor layer 34 is reflected by the reflecting section 37, and is then emitted to the outside of the phosphor layer 34. Further, another part of the fluorescence YL generated by the phosphor layer 34 is emitted to the outside of the phosphor layer 34 without the intervention of the reflecting section 37. In such a manner as described above, the fluorescence YL is emitted from the phosphor layer 34.

The fluorescence YL emitted from the phosphor layer 34 is non-polarized light with a non-uniform polarization direction, and therefore enters the polarization separation element 50A while keeping the non-polarized state after having passed through the first pickup optical system 26. The fluorescence YL is transmitted from the polarization separation element 50A toward the integrator optical system 31.

The P-polarized blue light beams $BL'_P$ having been emitted from the polarization separation element 50A enter the retardation plate 28. The retardation plate 28 is formed of a quarter wave plate ($\lambda/4$ plate) disposed in the light path between the polarization separation element 50A and the diffusely reflecting element 30. Therefore, the P-polarized blue light beams $BL'_P$ having been emitted from the polarization separation element 50A are converted into circularly polarized blue light beams $BL'_C$ by passing through the retardation plate 28, and then enter the second pickup optical system 29.

The second pickup optical system 29 is for converging the blue light beams $BL'_C$ toward the diffusely reflecting element 30. The second pickup optical system 29 is formed of, for example, pickup lenses 29a, 29b.

The diffusely reflecting element 30 is for diffusely reflecting the blue light beams $BL'_C$, which have been emitted from the second pickup optical system 29, toward the polarization separation element 50A. Among these elements, as the diffusely reflecting element 30, it is preferable to use an element for causing Lambertian reflection of the blue light beams $BL'_C$ having entered the diffusely reflecting element 30.

The diffusely reflecting element 30 is provided with a diffusely reflecting plate 30A and a drive source 30M such as an electric motor for rotating the diffusely reflecting plate 30A. The rotational axis of the drive source 30M is disposed roughly in parallel with the optical axis ax1. Thus, the diffusely reflecting plate 30A is configured so as to be rotatable in a plane intersecting with the center axis of the blue light beams $BL'_C$ entering the diffusely reflecting plate 30A. The diffusely reflecting plate 30A is formed to have, for example, a circular shape viewed from the direction of the rotational axis.

Figures 3A, 3B, 3C:
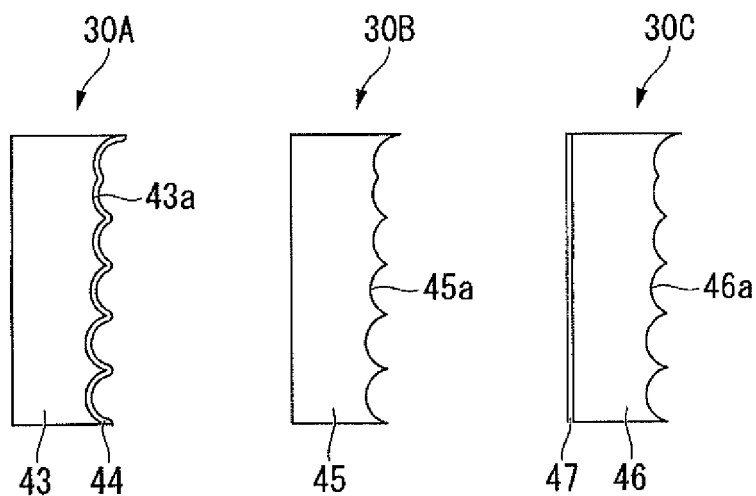
FIGS. 3A through 3C are cross-sectional views each showing a configuration example of a diffusely reflecting plate.

FIG. 3A is a cross-sectional view of the diffusely reflecting plate 30A.

For example, the diffusely reflecting plate 30A shown in FIG. 3A is provided with a base member 43 and a reflecting film 44. The base member 43 is formed of an arbitrary material such as glass.

Among the two surfaces of the base member 43, the surface located on the side to which the blue light beams $BL'_C$ are input is provided with a concavo-convex structure 43a including a plurality of curved surfaces disposed randomly. In the present embodiment, the concavo-convex structure 43a is formed of a plurality of recessed sections, and each of the recessed sections is formed to have a roughly spherical shape. The depth of the recessed section is, for example, about a quarter of the diameter of the whole spherical surface.

Figure 4:
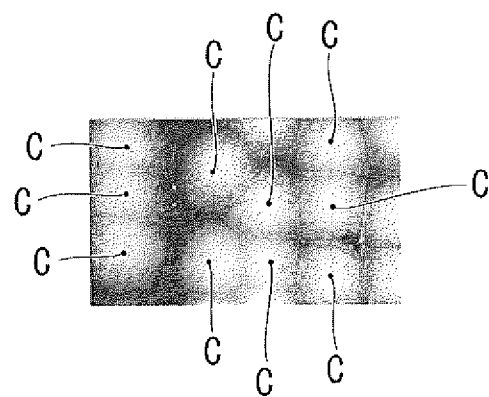
FIG. 4 is a plan view of the diffusely reflecting plate.

As shown in FIG. 4, the plurality of recessed sections is disposed randomly when viewing the diffusely reflecting plate 30A from the incident direction of the light. The reference symbols C shown in FIG. 4 show the centers of the respective recessed sections, and the centers C of the recessed sections are disposed randomly.

The reflecting film 44 is a metal reflecting film formed of metal high in light reflectance such as silver or aluminum. The reflecting film 44 is formed along the shape of the concavo-convex structure 43a, and the surface of the reflecting film 44 also exhibits the shape of the roughly spherical shape. Since the reflecting film 44 is formed on the surface of the concave-convex structure 43a, the concavo-convex structure 43a has a reflective property. When the blue light beams $BL'_C$ enter the surface of the diffusely reflecting plate 30A on which the reflecting film 44 is formed, the blue light beams $BL'_C$ are emitted after being reflected once, and no multiple reflection occurs. Thus, disturbance of the polarization state of the blue light beams $BL'_C$ in the case in which the blue light beams $BL'_C$ are reflected by the diffusely reflecting plate 30A is suppressed.

As the reflecting film 44, it is also possible to use, for example, a dielectric multilayer film besides the metal reflecting film. However, in the case of using the metal reflecting film as the reflecting film 44, the reflection characteristic is difficult to be degraded even in the case in which the incident angle of the light changes compared to the case of using the reflecting film formed of the dielectric multilayer film. As a result, the light loss due to the diffusely reflecting plate 30A decreases, and the efficiency of the light can be improved.

When manufacturing the diffusely reflecting plate 30A, firstly an etching prevention film made of, for example, chromium is formed on one surface of the base member made of, for example, glass.

Then, a plurality of holes is provided to the etching prevention film using laser processing or the like. On this occasion, in the laser processing machine, the coordinates of the formation positions are set so that the positions of the plurality of holes to be formed are randomly disposed. Thus, the plurality of holes disposed randomly is provided to the etching prevention film.

Then, the one surface of the base member is etched by, for example, wet etching using the etching prevention film as a mask. On this occasion, the condition of the wet etching is adjusted so that the isotropic etching is achieved. By performing etching in such a manner as described above, the etching fluid penetrates through the holes of the etching prevention film to form recessed sections at positions corresponding to the holes. Since isotropic etching is used as the etching process, etching proceeds isotropically centered on each of the holes, and as a result, the cross-sectional shape of the recessed section becomes a roughly spherical shape.

Subsequently, a metal film made of silver, aluminum, or the like is formed on one surface of the base member provided with the concavo-convex structure using a sputtering method, an evaporation method, or the like.

The diffusely reflecting plate 30A is completed using the process described hereinabove.

FIGS. 3B and 3C are each a cross-sectional view of another example (a diffusely reflecting plate 30B, a diffusely reflecting plate 30C) of the diffusely reflecting plate. Instead of the diffusely reflecting plate 30A, the diffusely reflecting plate 30B or the diffusely reflecting plate 30C can also be used.

The diffusely reflecting plate 30B shown in FIG. 3B has the base member 45 formed of metal such as silver or aluminum. Among the two surfaces of the base member 45, the surface located on the side to which the blue light beams $BL'_C$ are input is provided with a concavo-convex structure 45a including a plurality of curved surfaces disposed randomly. The shape of the concavo-convex structure 45a is substantially the same as the shape of the concavo-convex structure 43a shown in FIG. 3A. In this configuration, since the base material 45 itself has the light reflectivity, there is no need to form a metal film on the base member 45.

The diffusely reflecting plate 30C shown in FIG. 3C is provided with a base member 46 and a reflecting film 47. The base member 46 is formed of an arbitrary material such as glass. Among the two surfaces of the base member 46, the surface located on the side to which the blue light beams $BL'_C$ are input is provided with a concavo-convex structure 46a including a plurality of curved surfaces disposed randomly. The shape of the concavo-convex structure 46a is substantially the same as the shape of the concavo-convex structure 43a shown in FIG. 3A. Among the two surfaces of the base member 46, the surface located on the opposite side to the surface on the side to which the blue light beams $BL_C$ are input is provided with a reflecting surface 47 made of metal such as solver or aluminum.

As the diffusely reflecting plate according to the present embodiment, either of the diffusely reflecting plates shown in FIGS. 3A through 3C can be used. However, from the viewpoint that the light loss is small in amount, those having a light reflectivity in the surface located on the side to which the blue light beams $BL'_C$ are input such as the diffusely reflecting plate 30A shown in FIG. 3A or the diffusely reflecting plate 30B shown in FIG. 3B are preferable. This is because if there is adopted the configuration in which the blue light beams $BL'_C$ enter the inside of the base member 46 as in the diffusely reflecting plate 30C shown in FIG. 3C, the light loss might occur.

Further, although the diffusely reflecting plates shown in FIGS. 3A through 3C are each provided with the plurality of recessed sections disposed randomly, a plurality of recessed sections disposed regularly can also be provided. It should be noted that in the case in which the plurality of recessed sections is disposed regularly, although a diffraction phenomenon might occur, there can be obtained the advantage that degradation of the efficiency of the first light is suppressed.

In the illumination device 20A, by using such a diffusely reflecting element 30, it is possible to diffusely reflect the blue light beams $BL'_C$ to thereby obtain the blue light beams $BL'_C$ having a roughly homogenous illuminance distribution.

As shown in FIG. 2, the blue light beams $BL'_C$ having been diffusely reflected by the diffusely reflecting element 30 pass through the second pickup optical system 29 again, and then enter the retardation plate 28 to thereby be converted into the blue light beams $BL'_S$. The blue light beams $BL'_S$ enter the polarization separation element 50A. As described above, the blue light beams $BL'_C$ to be input to the diffusely reflecting element 30 are each circularly polarized light. If the polarization state of the blue light beam $BL'_C$ is not at all disturbed by the diffusely reflecting element 30, the blue light beam $BL'_S$ is the S-polarized light, and does not include a P-polarized light component. Even if the polarization state of the blue light beam $BL'_C$ is disturbed by the diffusely reflecting element 30 to some degree, the principal component of the blue light beam $BL'_S$ is the S-polarized light component. The S-polarized light component of each of the blue light beams $BL'_S$ is reflected by the polarization separation element 50A. The S-polarized light component of each of the blue light beams $BL'_S$ reflected by the polarization separation element 50A corresponds to a fourth component in the appended claims.

Thus, the blue light beams $BL'_S$ are emitted from the illumination device 20A as the illumination light WL together with the fluorescence YL having been transmitted through the polarization separation element 50A. In other words, the blue light beams $BL'_S$ and the fluorescence YL are emitted from the polarization separation element 50A toward the same direction. Thus, there can be obtained the illumination light beam (the white light beam) WL having the blue light beams $BL'_S$ and the fluorescence (the yellow light beam) YL combined with each other.

The illumination light beam WL having been emitted from the illumination device 20A enters the integrator optical system 31. The integrator optical system 31 is for homogenizing the luminance distribution (illuminance distribution). The integrator optical system 31 is formed of, for example, lens arrays 31a, 31b. The lens arrays 31a, 31b are each formed of an element having a plurality of microlenses arranged in an array.

The illumination light beam WL having passed through the integrator optical system 31 enters the polarization conversion element 32. The polarization conversion element is for uniforming the polarization direction of the illumination light beam WL. The polarization conversion element 32 is formed of, for example, a polarization separation film and a retardation plate. The polarization conversion element 32 converts one of the polarized light components into the other of the polarized light components (e.g., the P-polarized light component into the S-polarized light component) in order to uniform the polarization direction between the fluorescence YL having a non-uniform polarization direction and the S-polarized blue light beams $BL'_S$.

The illumination light beam WL, which has passed through the polarization conversion element 32 to thereby be uniformed in the polarization direction, enters the overlapping optical system 33. The overlapping optical system 33 is for making the illumination light beams WL having been emitted from the polarization conversion element 32 overlap each other. The overlapping optical system 33 is formed of an overlapping lens. The illuminance distribution in the illumination target area is homogenized by the integrator optical system 31 and the overlapping optical system 33.

In the illumination device 20A having such a configuration as described above, since the diffusely reflecting plate 30A has the concavoconvex structure including a plurality of curved surfaces randomly arranged, the disturbance in the polarization state of the blue light beams BL'$_C$ caused when the blue light beams BL'$_C$ are reflected by the diffusely reflecting plate 30A is suppressed, and at the same time, the diffusion angle can be increased.

If the polarization state of the blue light beams BL'$_C$ is significantly disturbed by the diffusely reflecting plate 30A, the P-polarized light component included in the blue light beams BL'$_S$ increases, and therefore, the component to be reflected by the polarization separation element 50A decreases. However, according to the invention, since the P-polarized light component included in the blue light beams BL'$_S$ can be decreased, reduction of the light intensity of the blue light beams BL'$_S$ to be emitted from the illumination device 20A can be suppressed. As a result, it is possible to realize the illumination device 20A capable of homogenization of the illuminance distribution and remediation of the speckle noise while suppressing the degradation of the efficiency of the first light.

In particular, in the case of the present embodiment, since the diffusely reflecting element 30 is provided with the diffusely reflecting plate 30A disposed rotatably, the irradiation position of the blue light beams BL'$_C$ on the diffusely reflecting element 30 varies with time. Therefore, the damage of the diffusely reflecting plate 30A due to the irradiation with the blue light beams BL'$_C$ can be reduced. Further, since the concave-convex structure located on the light path of the blue light beams BL'$_C$ varies with time, the effect of the homogenization of the illuminance distribution and the effect of the remediation of the speckle noise can further be enhanced.

In the illumination device 20A, the illumination light beam WL superior in color purity and color reproducibility can be obtained using the fluorescence YL generated by exciting the phosphor layer 34 with the excitation light beams BL$_S$ and the blue light beams BL'$_S$ obtained by diffusely reflecting the blue light beams BL'$_P$ with the diffusely reflecting element 30.

In other words, the blue light beam BL' with a peak wavelength of 460 nm is a blue light beam higher in luminosity factor than the excitation light beam BL with a peak wavelength of 446 nm. Further, a broader color gamut can be obtained in the case of using the light beam with a peak wavelength of 460 nm than in the case of using the light beam with a peak wavelength of 446 nm. In other words, the light beam with a peak wavelength of 460 nm is more suitable for forming a color image than the light beam with a peak wavelength of 446 nm. Therefore, the color gamut (the range of the color reproducibility) of the illumination light beam WL can further be enhanced in the case of obtaining the illumination light beam WL using the blue light beam BL' with a peak wavelength of 460 nm and the fluorescence YL than in the case of obtaining the illumination light beam WL using the excitation light beam BL with a peak wavelength of 946 nm and the fluorescence YL.

Further, the second semiconductor laser 212 for emitting the excitation light beam BL is generally lower in price than the first semiconductor laser 211 for emitting the blue light beam BL'. Therefore, in the illumination device 20A, the enhancement of the color gamut can be achieved at lower price by using the second semiconductor lasers 212 for emitting the laser beams with a peak wavelength of 446 nm as the laser sources for the excitation light beams, and using the first semiconductor lasers 211 for emitting the laser beams with a peak wavelength of 460 nm as the laser sources for the blue light beams.

In such a manner as described above, according to the projector 1 equipped with such an illumination device 20A, it becomes possible to perform display superior in image quality while achieving miniaturization and weight reduction of the device.

Second Embodiment

A second embodiment of the invention will hereinafter be explained using FIGS. 5 through 9.

A projector 1b according to the present embodiment is equipped with an illumination device 2b. Although the basic configuration of the projector 1b is the same as that of the projector 1 according to the first embodiment, the configuration of the illumination device 2b is different from the configuration of the illumination device 2 of the projector 1. The constituents common to the projector 1 and the projector 1b are denoted with the same reference symbols, and the explanation thereof will arbitrarily be omitted.

Projector

Figure 5:
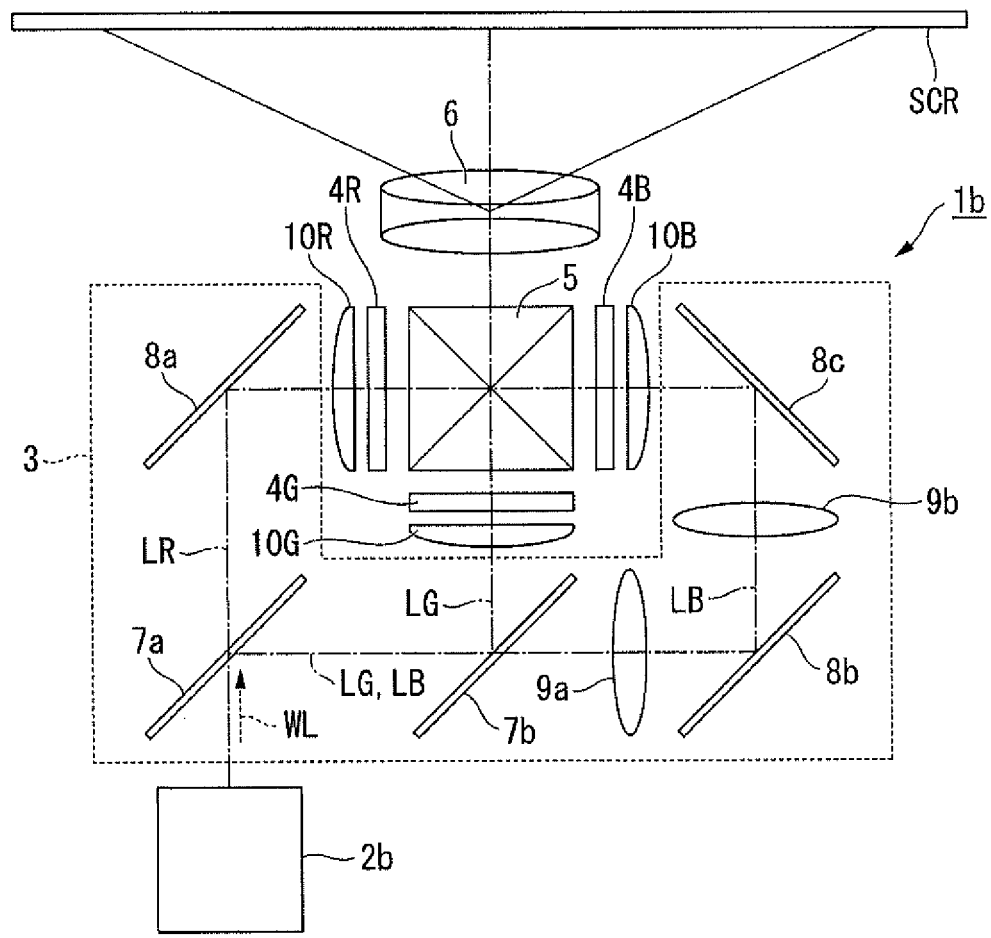
FIG. 5 is a schematic configuration diagram of a projector according to a second embodiment of the invention.

FIG. 5 is a plan view showing a schematic configuration of the projector 1b according to the present embodiment.

As shown in FIG. 5, the projector 1b is provided with the illumination device 2b, the color separation optical system 3, the light modulation device 4R, the light modulation device 4G, the light modulation device 4B, the combining optical system 5, and the projection optical system 6.

Illumination Device

Then, the illumination device 2b according to the present embodiment will be explained.

Figure 6:
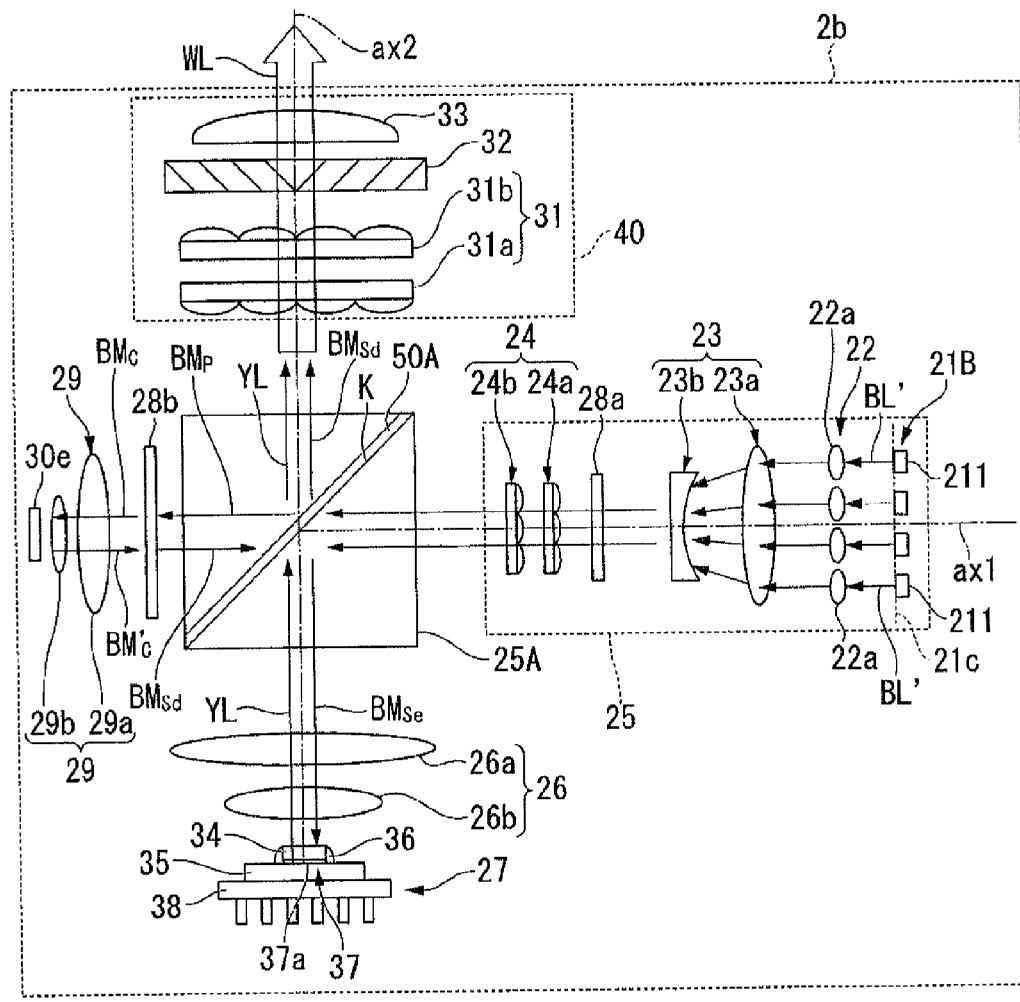
FIG. 6 is a schematic configuration diagram showing an illumination device according to the second embodiment.

FIG. 6 is a schematic configuration diagram showing the illumination device according to the second embodiment.

As shown in FIG. 6, the illumination device 2b includes an array light source 21B, the collimator optical system 22, the afocal optical system 23, a retardation plate 28a, the homogenizer optical system 24, the polarization separation element 50A, the first pickup optical system 26, the fluorescence emitting element 27, a retardation element 28b, the second pickup optical system 29, a diffusely reflecting element 30e, and the homogenous illumination optical system 40. The array light source 21B, the collimator optical system 22, the afocal optical system 23, the retardation plate 28a, and the homogenizer optical system 24 constitute a light source device 25. The light source device 25 emits third light beam including the P-polarized light component with respect to the polarization separation element 50A and the S-polarized light component with respect to the polarization separation element 50A. The P-polarized light component included in the third light beam corresponds to a first component in a first polarization state in the appended claims. The S-polarized light component included in the third light beam corresponds to a second component in a second polarization state in the appended claims. Although the third light beam is one of elliptically-polarized light and circularly-polarized light in the case of the present embodiment, the third light beam can also be a light beam having P-polarized light and S-polarized light mixed with each other.

The light source device 25, the polarization separation element 50A, the retardation element 28b, the second pickup optical system 29, and the diffusely reflecting element 30e are disposed on the optical axis ax1. Meanwhile, the fluorescence emitting element 27, the first pickup optical system 26, the polarization separation element 50A, and the homogenous illumination optical system 40 are disposed on the optical axis ax2. The optical axis ax1 and the optical axis ax2 are located in the same plane, and are perpendicular to each other.

The array light source 21B is provided with a plurality of semiconductor lasers 211. The semiconductor lasers 211 each emit a light beam BL' formed of a linearly-polarized blue light beam. As described later, a part of the light beam BL' is separated out by the polarization separation element 50A to form an excitation light beam for the phosphor layer. Another part of the light beam BL' is separated out by the polarization separation element 50A to form the blue light beam used for displaying an image via the diffusely reflecting element.

The light beams BL' having been emitted from the array light source 21B enter the collimator optical system 22. The light beams BL' having been transmitted through the collimator optical system 22 enter the afocal optical system 23.

The light beams BL' having been transmitted through the afocal optical system 23 are transmitted through the retardation plate 28a to thereby be converted into circularly-polarized light beams. The light beams BL' having been transmitted through the retardation plate 28a enter the homogenizer optical system 24.

The light beams BL' having been emitted from the light source device 25 enter the polarization separation element 50A. The polarization separation element 50A separates the circularly-polarized light beam BL' into light beam $BM_{Se}$ as the S-polarized light component with respect to the polarization separation element 50A and light beam $BM_P$ as the P-polarized light component. The light beam $BM_{Se}$ as the S-polarized light component is reflected by the polarization separation element 50A, proceeds toward the fluorescence emitting element 27, and is then used as the excitation light beam. The light beam $BM_P$ as the P-polarized light component is transmitted through the polarization separation element 50A, and then proceeds toward the diffusely reflecting element 30e. Further, the polarization separation element 50A has a color separation property of transmitting fluorescence YL different in wavelength band from the blue light beams irrespective of the polarization state.

The light beams $BM_{Se}$ having been reflected by the polarization separation element 50A enter the first pickup optical system 26.

The phosphor layer 34 includes a fluorescent material to be excited by the excitation light beams (the light beams $BM_{Se}$) with a wavelength of, for example, 460 nm. The fluorescent material generates fluorescence (a yellow light beam) YL having a peak wavelength in a wavelength band of, for example, 500 through 700 nm. The S-polarized light beams $BM_{Se}$, which are reflected by the polarization separation element 50A and are each the second component, enter the phosphor layer 34.

The fluorescence YL having been emitted from the phosphor layer 34 is non-polarized light with a non-uniform polarization direction. The fluorescence YL passes through the first pickup optical system 26, and then enters the polarization separation element 50A. Since the polarization separation element 50A has a property of transmitting the fluorescence YL irrespective of the polarization state, the fluorescence YL is transmitted through the polarization separation element 50A, and then proceeds toward the integrator optical system 31.

Meanwhile, the P-polarized light beams $BM_P$ having passed through the polarization separation element 50A enter the retardation element 28b. The retardation element 28b is formed of a quarter wave plate disposed in the light path between the polarization separation element 50A and the diffusely reflecting element 30e. Therefore, the P-polarized light beams $BM_P$ having been emitted from the polarization separation element 50A are each converted by the retardation element 28b into a circularly-polarized light beam $BM_C$. In the present embodiment, the light beam $BM_C$ is a right circularly-polarized light beam. Subsequently, the light beams $BM_C$ enter the second pickup optical system 29.

The second pickup optical system 29 converges the light beams $BM_C$ toward the diffusely reflecting element 30e.

The diffusely reflecting element 30e diffusely reflects the light beams $BM_C$, which have been emitted from the second pickup optical system 29, toward the polarization separation element 50A. The diffusely reflecting element 30e has a concavo-convex structure 143 including a plurality of curved surfaces similarly to the diffusely reflecting element 30 in the first embodiment. The first component, which has passed through the retardation element 28b whereby polarization state of the first component is changed, enters the diffusely reflecting element 30e.

The case, in which the light beams $BM_C$ having entered the diffusely reflecting element 30e are converted into left circularly-polarized light beams $BM'_C$, will be described.

The light beams $BM'_C$ re-enter the retardation element 28b to thereby be converted into the S-polarized light beams $BM_{Sd}$. Subsequently, the light beams $BL_{Sd}$ enter the polarization separation element 50A. In the present embodiment, since the light beams $BM'_C$ are the left circularly-polarized light beams, the light beams $BM_{Sd}$ correspond to a fourth component in the second polarization state in the appended claims. In other words, the first component having been reflected by the diffusely reflecting element 30e and then transmitted through the retardation element 28b in the appended claims does not include the component in the first polarization state. It should be noted that in some cases, the light beam $BM_C$ having entered the diffusely reflecting element 30e is not reflected as a complete left circularly-polarized light beam depending on the shape of the concavo-convex structure 143. In this case, the first component having been reflected by the diffusely reflecting element 30e and then transmitted through the retardation element 28b includes some of the component in the first polarization state.

The S-polarized light beam $BM_{Sd}$ is reflected by the polarization separation element 50A, and then proceeds toward the integrator optical system 31. In such a manner as described above, there can be obtained the white illumination light beam WL having the light beams $BM_{Sd}$ as the blue light beam and the fluorescence YL as the yellow light beam combined with each other.

Incidentally, in order to improve the efficiency of the light beams having been emitted from the array light source 21B, it is preferable for the light beams $BM_{Sd}$ to enter the polarization separation element 50A as the S-polarized light beams. In the case in which the light beams $BM'_C$ are elliptically-polarized light beams, the light beams $BM'_C$ are kept as the elliptically-polarized light beams even after being transmitted through the retardation element 28b. Since the light beams $BM_{Sd}$ entering the polarization separation element 50A are the elliptically-polarized light beams, the P-polarized light component, which is not reflected by the polarization separation element 50A, is included. Therefore, the light intensity of the light beams $BM_{Sd}$ reflected by the polarization separation element 50A decreases. In the case in which the light beam $BM'_C$ is the left circularly-polarized light beam, since the light beam $BM'_C$ is converted by the retardation element 28b into the linearly-polarized light beam as the S-polarized light beam, the light intensity of the light beam $BM_{Sd}$ reflected by the polarization separation element 50A becomes the maximum.

Here, it is assumed that the light beams perpendicularly enter the diffusely reflecting element 30e. In order for the diffusely reflecting element 30e to convert the right circularly-polarized light beam $BM_C$ into the left circularly-polarized light beam $BM'_C$, it is necessary for the diffusely reflecting element 30e to have the property of reflecting the linearly-polarized light, which has entered the diffusely reflecting element 30e, while maintaining the polarization state. In the case in which the polarization state is not maintained, the light beam $BM'_C$ becomes the elliptically-polarized light beam. Therefore, the higher the rate, at which the polarization state of the linearly-polarized light beam is maintained by the diffusely reflecting element 30e, is, the higher the light intensity of the light beam $BM_{Sd}$ reflected by the polarization separation element 50A is. As a result, the component used as the illumination light beam WL increases, and thus, the light efficiency can be improved.

As a specific device for maintaining the polarization state, it is possible to adjust the aspect ratio of the concavo-convex structure of the diffusely reflecting element 30e within an appropriate range.

Figure 7:
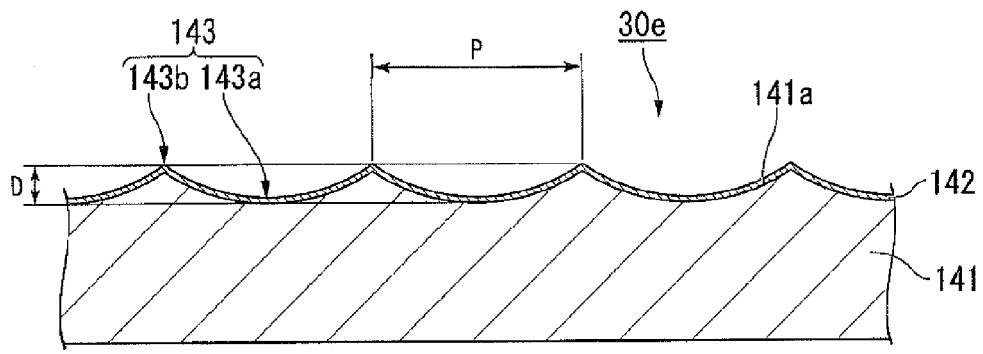
FIG. 7 is a cross-sectional view showing a diffusely reflecting element according to the embodiment.

FIG. 7 is a cross-sectional view showing the diffusely reflecting element 30e according to the present embodiment.

As shown in FIG. 7, the diffusely reflecting element 30e is provided with a base member 141, and a reflecting film 142 disposed on one surface 141a of the base member 141. On the one surface of the base member 141, there are formed the concavo-convex structure 143 having recessed sections 143a and projected sections 143b disposed alternately. The reflecting film 142 is formed of a metal material high in reflectance such as silver or aluminum. The material of the base member 141 is not particularly limited, but is preferably a material high in heat resistance. The reflecting film 142 is formed to have such a predetermined film thickness that the shape of the concavo-convex structure 143 of the base member 141 is reflected on the reflecting film 142. It should be noted that the base member 141 can also be formed of a material having light reflectivity, and in such a case, it is not required to separately dispose the reflecting film.

Assuming that the distance between the two projected sections 143b adjacent to each other (or the distance between the two recessed sections 143a adjacent to each other) is a pitch P, and the distance from the lowermost portion of the recessed section 143a to the uppermost portion of the projected section 143b is a depth D of the recessed section 143a, the aspect ratio of the concavo-convex structure 143 is defined as D/P.

Here, the inventors conducted a study for a relationship between the aspect ratio of the concavo-convex structure 143 and the light efficiency. Specifically, the diffusely reflecting elements 30e different in aspect ratio of the concavo-convex structure 143 from each other were actually manufactured, and then the light intensity of the light emitted via the polarization separation element 50A was measured. Further, the light intensity obtained in the case of replacing the diffusely reflecting element 30e with a specular reflecting element having a flat reflecting surface was defined as a reference light intensity. Then, the ratio between the light intensity obtained using each of the diffusely reflecting elements 30e and the reference light intensity was calculated. In the specular reflecting element, since the incident light is specularly reflected only once by the reflecting element, the polarization state of the linearly-polarized light beam entering perpendicularly the reflecting element is completely maintained. Therefore, in the case of replacing the diffusely reflecting element with the specular reflecting element, the light efficiency becomes the maximum.

Figure 8:
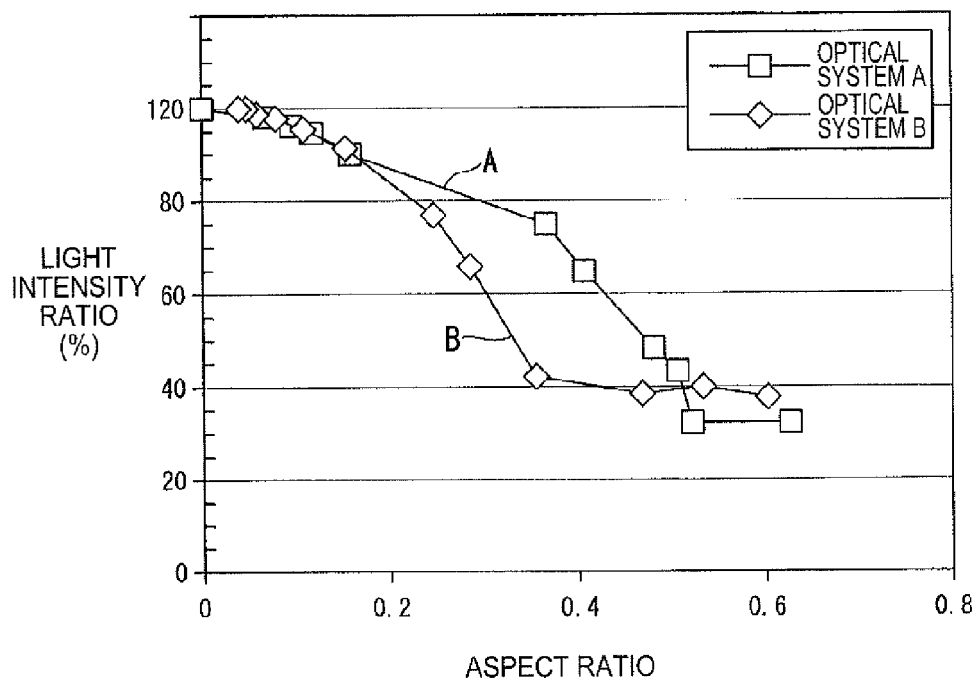
FIG. 8 is a graph showing a relationship between the aspect ratio of the diffusely reflecting element and a light intensity ratio.

FIG. 8 is a graph showing a relationship between the aspect ratio of the diffusely reflecting element and a light intensity ratio.

The horizontal axis in FIG. 8 represents the aspect ratio, and the vertical axis in FIG. 8 represents the light intensity ratio (%). The two graphs, namely the graph A and the graph B, show the results of two types of experiments different in the configuration of the optical system on the light path of the light beam entering the diffusely reflecting element from each other, and thus different in the intensity distribution of the light entering the diffusely reflecting element from each other.

It should be noted that the fact that the aspect ratio is zero corresponds to the fact that the specular reflecting element is used. Therefore, in the case in which the aspect ratio is zero, the polarization state of the linearly-polarized light beam having perpendicularly entered the diffusely reflecting element is completely maintained, and as a result, the light intensity ratio becomes 100%.

As shown in FIG. 8, as a tendency common to the two types of optical systems, in the area in which the light intensity ratio is equal to or higher than 75% (in the area in which the aspect ratio is equal to or lower than 0.35 in the optical system A, and the area in which the aspect ratio is equal to or lower than 0.25 in the optical system B), there is shown a tendency that the light intensity ratio gently decreases as the aspect ratio increases. In contrast, in the area in which the light intensity ratio is lower than 75% (in the area in which the aspect ratio is higher than 0.35 in the optical system A, and the area in which the aspect ratio is higher than 0.25 in the optical system B), there is shown a tendency that the light intensity ratio rapidly decreases as the aspect ratio increases. The reason therefor is assumed as follows. In the area in which the aspect ratio is relatively low, the recessed section is shallow, and therefore, the number of times of the reflection of the incident light beam in the recessed section is small, and thus, the provability that the polarization state is maintained is high. In contrast, in the area in which the aspect ratio is relatively high, the recessed section is deep, and therefore, the provability of the occurrence of the multiple reflection of the incident light beam in the recessed section increases, and thus, the provability that the polarization state is maintained decreases. As described above, it is preferable to eliminate the multiple reflection.

From the experimental results described above, it was verified that by setting the aspect ratio of the concavo-convex structure so that the light intensity ratio described above shows a value equal to or higher than 75%, rather high light efficiency can be obtained. It should be noted that as shown in FIG. 8, the range of the aspect ratio for the light intensity ratio to show the value equal to or higher than 75% depends on the optical system used.

As described above, from the viewpoint of improving the light efficiency, the aspect ratio of the concavo-convex structure is preferably as low as possible. However, if the aspect ratio of the concavo-convex structure is set too low, another problem arises.

The diffusion angle distribution of the diffused light correlates with the aspect ratio of the concavo-convex structure, and if the aspect ratio of the concavo-convex structure is low, the diffusion angle distribution decreases accordingly. In general, fluorescence emitted from a phosphor layer and diffusion light emitted from a diffusion layer are different in light distribution from each other. Specifically, the diffusion angle distribution of the diffusion light is smaller than the diffusion angle distribution of the fluorescence. Therefore, in the case of the illumination device according to the present embodiment, if the aspect ratio of the concavo-convex structure is too low, there is a problem that the diffusion angle distribution of the blue light beam becomes too small, and the difference from the diffusion angle distribution of the yellow light beam emitted from the fluorescence emitting element increases to cause the color unevenness.

Therefore, the inventors conducted a search for a relationship between the aspect ratio of the concavo-convex structure and the color unevenness.

Specifically, the diffusely reflecting elements with the aspect ratio of the concavo-convex structure changed variously were actually manufactured, then incorporated into the projector according to the present embodiment, and then the light emitted from the illumination device was projected on a screen to measure the color unevenness of the projection image. As the measurement method of the color unevenness, a zoom lens was set to the wide-angle setting, and the deviation value (Δu'v') from a blackbody locus was measured at 13 measurement points on the screen (illumination target area) using a color luminometer. The fact that the deviation value Δu'v' from the blackbody locus is high shows the fact that color unevenness is high.

Figure 9:
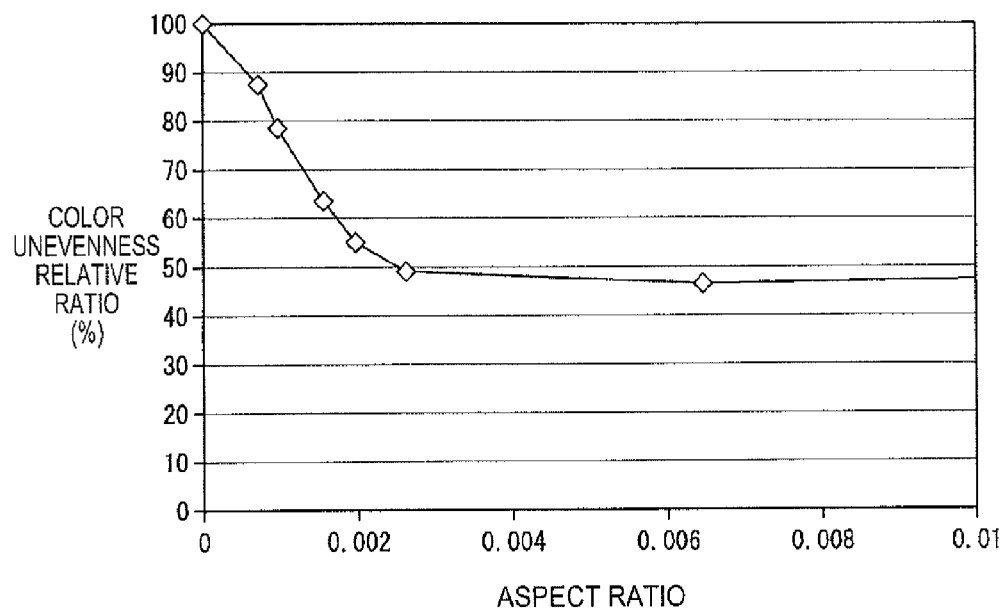
FIG. 9 is a graph showing a relationship between the aspect ratio of the diffusely reflecting element and a color unevenness relative ratio.

FIG. 9 is a graph showing a relationship between the aspect ratio of the diffusely reflecting element and a color unevenness relative ratio. The horizontal axis represents the aspect ratio, and the vertical axis represents the color unevenness relative ratio (%). Here, the deviation value Δu'v' obtained when replacing the diffusely reflecting element 30e with the specular reflecting element is defined as reference color unevenness. The color unevenness relative ratio is a ratio of the deviation value (the color unevenness) Δu'v', which is obtained when using the diffusely reflecting element having a predetermined aspect ratio, to the reference color unevenness. The lower the color unevenness relative ratio is, the more difficult it is to recognize the color unevenness.

As shown in FIG. 9, in the area in which the color unevenness relative ratio exceeds 50%, rephrasing with the aspect ratio, in the area in which the aspect ratio is lower than 0.002, there is shown a tendency that the color unevenness relative ratio rapidly decreases from 100% as the aspect ratio increases. In contrast, in the area in which the color unevenness relative ratio is equal to or lower than 50%, rephrasing with the aspect ratio, in the area in which the aspect ratio is equal to or higher than 0.002, there is shown a tendency that even if the aspect ratio is increased, the color unevenness relative ratio does not significantly vary, but becomes roughly constant at the value of about 50%.

Further, the inventors conducted a feeling evaluation of the color unevenness by actually viewing a projection image on the screen. The result is shown in Table 1 below.

In Table 1, there are shown the results of two types of experiments having the respective intensity distributions of the incident light made different from each other by making the configurations (the optical system A and the optical system B) of the optical system on the light path of the light beam entering the diffusely reflecting element different from each other. It should be noted that the symbol "○" in Table 1 represents that the color unevenness is not visually recognized. The symbol "Δ" represents that the color unevenness is visually recognized, but is mild enough to be ignored. The symbol "x" represents that the color unevenness is disturbing.

TABLE 1

| COLOR UNEVENNESS RELATIVE RATIO | 50% | 90% | 100% |
| --- | --- | --- | --- |
| OPTICAL SYSTEM A | ○ | ○ | x |
| OPTICAL SYSTEM B | ○ | Δ | x |

As is obvious from Table 1, it is understood that in the case in which the color unevenness relative ratio is 50%, the color unevenness is not visually recognized. It is understood that in the case in which the color unevenness relative ratio is 90%, the color unevenness is visually recognized depending on the optical system, but is in a level of causing no particular problem in displaying an image. It is also understood that in contrast, in the case in which the color unevenness relative ratio is 100%, the color unevenness is disturbing, and is in a level of posing a problem for displaying an image.

According to the result shown in FIG. 9 and Table 1, it is understood that by setting the aspect ratio of the concavo-convex structure so that the color unevenness relative ratio shows a value equal to or lower than 90%, the color unevenness is reduced to a level of posing no practical problem. Further, it is understood that by setting the aspect ratio of the concavo-convex structure so that the color unevenness relative ratio shows a value equal to or lower than 50%, the color unevenness is reduced to a level as low as possible. It should be noted that the aspect ratio at which the color unevenness relative ratio becomes 90% is 0.0075, and the aspect ratio at which the color unevenness relative ratio becomes 50% is 0.0027.

As described hereinabove, in order to achieve a balance of the diffusion angle distribution between the diffusion light beam and the fluorescence to suppress the color unevenness while improving the light efficiency of the blue light beam obtained from the diffusely reflecting element, it is sufficient to control the aspect ratio of the concavo-convex structure of the diffusely reflecting element so that the ratio between the light intensity of the light emitted via the polarization separation element and the reference light intensity is set to be equal to or higher than 75%, and the color unevenness relative ratio is set to be equal to or lower than 90%, or more preferably, equal to or lower than 50%.

Incidentally, in order to control the light intensity ratio and the color unevenness relative ratio within a predetermined range, it is preferable for the concavo-convex structure of the diffusely reflecting element to be a regular structure. In other words, it is preferable to design the concavo-convex structure so as to have a constant pitch P or a constant depth D of the recessed sections. However, even if the pitch P of the concavo-convex structure and the depth D of the recessed sections of the diffusely reflecting element actually completed are fluctuated due to a factor on the manufacturing process of the diffusely reflecting element, the diffusely reflecting element can be used for the illumination device according to the present embodiment with no problem. Alternatively, it is possible to design the concavo-convex structure to have random pitches P or random depths D of the recessed sections.

The inventors manufactured the diffusely reflecting element having a regular concavo-convex structure and the diffusely reflecting element having a random concavo-convex structure, and then evaluated the light efficiency and the color unevenness. Specifically, the diffusely reflecting element with the constant aspect ratio of 0.05, and the diffusely reflecting element with the aspect ratio randomly varied centered on 0.05 were used.

The light efficiency (the light intensity shown in FIG. 8) was 96% in both cases.

Figure 10:
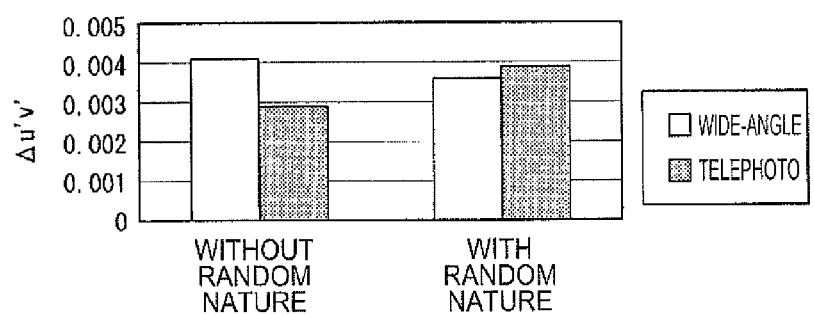
FIG. 10 is a graph for comparing the color unevenness between the presence and the absence of randomness in the aspect ratio of a concavo-convex structure.

Further, FIG. 10 shows the result obtained by measuring the deviation value (Δu'v') described above setting the zoom lens of the projector to the wide-angle setting and the telephoto setting.

As shown in FIG. 10, the difference in the deviation value Δu'v' due to the presence or absence of the random nature in the concavo-convex structure was about 0.001 in both of the wide-angle setting and the telephoto setting. The difference in the deviation value Δu'v' of about 0.001 is a negligible level as the color unevenness observed with eyes.

According to the above, it was confirmed that the pitch P of the concavo-convex structure of the diffusely reflecting element and the depth D of the recessed sections can be constant or random. It should be noted that the aspect ratio in the case in which the pitch P and the depth D of the recessed sections are random can be thought to be an average value of the pitches P of the recessed sections or the projected sections in a plurality of places, and an average value of the depths ID of the recessed sections. The parameter of the recessed sections or the projected sections in calculating the average values can arbitrarily be determined.

Third Embodiment

A third embodiment of the invention will hereinafter be explained with reference to FIG. 11.

Although the basic configuration of the illumination device according to the present embodiment is substantially the same as that of the illumination device according to the second embodiment, the positional relationship between the diffusely reflecting element and the fluorescence emitting element is different from that in the second embodiment.

Figure 11:
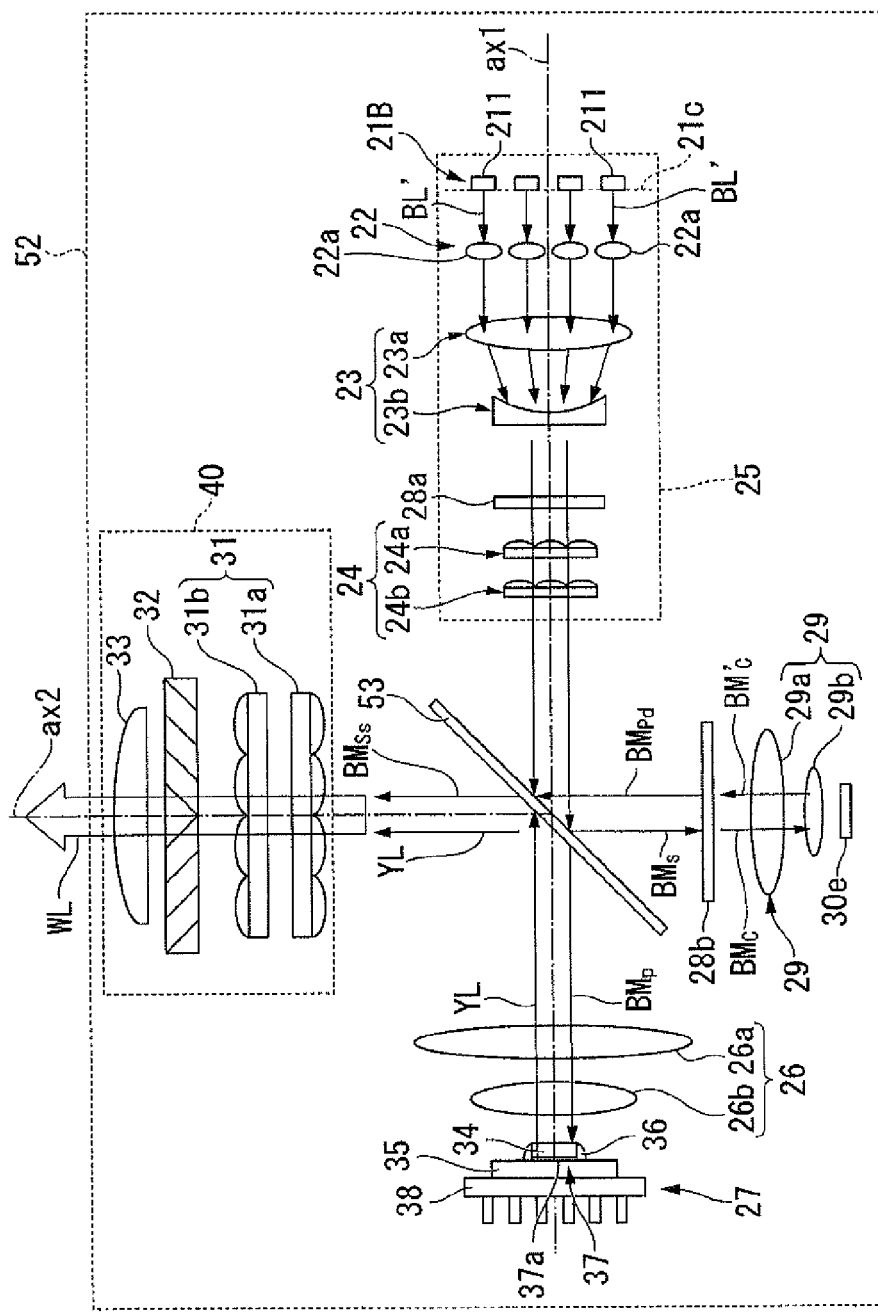
FIG. 11 is a schematic configuration diagram of an illumination device according to a third embodiment of the invention.

FIG. 11 is a schematic configuration diagram of the illumination device according to the third embodiment.

In FIG. 11, the constituents common to the illumination device 2b according to the second embodiment and the illumination device according to the present embodiment are denoted with the same reference symbols, and the explanation thereof will be omitted.

The point in which the polarization separation element according to the present embodiment is different from the polarization separation element according to the second embodiment is the point that there is further included the property of reflecting the fluorescence different in wavelength band from the blue light beam irrespective of the polarization state of the fluorescence. Due to such a difference in property of the polarization separation element, in the illumination device according to the present embodiment, the positional relationship between the diffusely reflecting element and the fluorescence emitting element is reversed compared to the second embodiment.

As shown in FIG. 11, in the illumination device 52 according to the present embodiment, the light source device 25, the polarization separation element 53, the first pickup optical system 26, and the fluorescence emitting element 27 are disposed on the optical axis ax1.

The diffusely reflecting element 30e, the second pickup optical system 29, the retardation element 28b, the polarization separation element 53, the integrator optical system 31, the polarization conversion element 32, and the overlapping optical system 33 are disposed on the optical axis ax2. Also in the present embodiment, the diffusely reflecting element 30e has the concavo-convex structure, and the aspect ratio of the concavo-convex structure is set similarly to the second embodiment.

In the projector according to the present embodiment, the S-polarized light beam $BM_S$ is reflected by the polarization separation element 53, and then proceeds toward the retardation element 28b. The light beam $BM_S$ having been emitted from the polarization separation element 53 is converted by the retardation element 28b into a right circularly-polarized light beam $BM_C$. Subsequently, the light beams $BM_C$ enter the diffusely reflecting element 30e via the second pickup optical system 29. The diffusely reflecting element 30e converts the light beam $BM_C$, which has entered the diffusely reflecting element 30e, into a left circularly-polarized light beam $BM'_C$, and then diffusely reflects the left circularly-polarized light beam $BM'_C$ toward the polarization separation element 53. Also in the present embodiment, the case in which the light beam $BM'_C$ having been emitted from the diffusely reflecting element 30e is the left circularly-polarized light beam will be explained.

The light beam $BM'_C$ having been diffusely reflected by the diffusely reflecting element 30e re-enters the retardation element 28b to thereby be converted into a P-polarized light beam $BM_{Pd}$. Subsequently, the P-polarized light beam $BM_{Pd}$ is transmitted through the polarization separation element 53, and then proceeds toward the integrator optical system 31. Meanwhile, the light beam $BM_P$ as the P-polarized light component is transmitted through the polarization separation element 53, and then proceeds toward the fluorescence emitting element 27 as the excitation light beam.

Also in the present embodiment, there can be obtained substantially the same advantage as in the first embodiment that the color unevenness can be suppressed while improving the light efficiency of the blue light beam obtained from the diffusely reflecting element 30e.

It should be noted that the scope of the invention is not limited to the embodiments described above, but various modifications can be provided thereon within the scope or the spirit of the invention.

For example, although in the diffusely reflecting plate used in the embodiment described above, the concavo-convex structure is constituted by a plurality of recessed sections each formed of the curved surface, the concavo-convex structure can also be constituted by a plurality of projected sections each formed of a curved surface. In other words, it is also possible to use the diffusely reflecting plate having the concavo-convex shape reversed from that of the diffusely reflecting plate shown in any of FIGS. 3A through 3C. Further, the concavo-convex structure can also be constituted by a plurality of recessed sections each formed of a curved surface and a plurality of projected sections each formed of a curved surface.

Although in the first embodiment, there is cited the example in which the first wavelength band and the second wavelength band are different from each other, the first wavelength band can also coincide with the second wavelength band.

Although in the illumination device according to each of the embodiments, the quarter wave plate is used as the retardation element disposed between the polarization separation element and the diffusely reflecting element, the phase difference of the retardation element is not necessarily limited to a quarter wavelength, but can arbitrarily be modified. Besides the above, the shape, the number, the arrangement, the material, and so on of the variety of constituents of the illumination device and the projector are not limited to those of the embodiments described above, but can arbitrarily be modified.

In each of the embodiments, the diffusely reflecting element can also be fixed, or can rotatably be configured as in the first embodiment.

Although in each of the embodiments, there is described the example of mounting the light source device according to the invention in the projector using the liquid crystal light valves, the invention is not limited to these examples. The invention can also be implemented in the projector using digital micromirror devices as the light modulation devices.

Although in each of the embodiments, there is described the example of mounting the light source device according to the invention in the projector, the invention is not limited to these examples. The light source device according to the invention can also be applied to lighting equipment, a headlight of a vehicle, and so on.

The entire disclosure of Japanese Patent Application No. 2014-084815, filed on Apr. 16, 2014 and 2015-020256, filed on Feb. 4, 2015 are expressly incorporated by reference herein.

What is claimed is:

1. An illumination device comprising:
a light source device adapted to emit a third light beam including a first component in a first polarization state;
a polarization separation element to which the third light beam is input;
a retardation element to which the first component is input via the polarization separation element; and
a diffusely reflecting element having a concavo-convex structure including a plurality of curved surfaces, the diffusely reflecting element receiving the first component that has passed through the retardation element whereby polarization state of the first component is changed,
wherein a fourth component in a second polarization state different from the first polarization state out of the first component, which has been reflected by the diffusely reflecting element, and then passed through the retardation element, is emitted via the polarization separation element.

2. The illumination device according to claim 1, wherein the plurality of curved surfaces is randomly arranged in a planar view.

3. The illumination device according to claim 1, wherein the diffusely reflecting element has the concavo-convex structure on a surface on a side to which the first component is input, and
the concavo-convex structure has reflectivity.

4. The illumination device according to claim 3, wherein a metal reflecting film is disposed on a surface of the concavo-convex structure.

5. The illumination device according to claim 1, wherein the concavo-convex structure is configured so that a light intensity of the fourth component having been emitted via the polarization separation element is one of equal to and higher than 75% of the light intensity obtained in a case of replacing the diffusely reflecting element with a reflecting element having a flat reflecting surface.

6. The illumination device according to claim 1, wherein the third light beam includes a second component in the second polarization state, and
the polarization separation element transmits a light beam with a wavelength different from a wavelength of the third light beam irrespective of a polarization state of the light beam,
the illumination device further comprising:

a phosphor layer to which the second component, which has been emitted from the light source device, and then reflected by the polarization separation element, is input; and
a reflecting section disposed on an opposite side of the phosphor layer to the surface to which the second component is input, and adapted to reflect light generated by the phosphor layer.

7. The illumination device according to claim 1, wherein the third light beam includes a second component in the second polarization state,
the polarization separation element reflects a light beam with a wavelength different from a wavelength of the third light beam irrespective of a polarization state of the light beam, and
the illumination device further comprising:
a phosphor layer to which the second component, which has been emitted from the light source device, and then transmitted through the polarization separation element, is input; and
a reflecting section disposed on an opposite side of the phosphor layer to the surface to which the second component is input, and adapted to reflect light generated by the phosphor layer.

8. The illumination device according to claim 6, wherein assuming that color unevenness in an illumination target area in a case of replacing the diffusely reflecting element with the reflecting element is reference color unevenness, the concavo-convex structure is configured so that the color unevenness is one of equal to and lower than 90% of the reference color unevenness.

9. The illumination device according to claim 8, wherein the concavo-convex structure is configured so that the color unevenness is one of equal to and lower than 50% of the reference color unevenness.

10. The illumination device according to claim 9, wherein an aspect ratio of the concavo-convex structure is one of equal to and higher than 0.002.

11. The illumination device according to claim 1, wherein the diffusely reflecting element is disposed rotatably in a plane intersecting with a center axis of the first component entering the diffusely reflecting element.

12. The illumination device according to claim 1, wherein the concavo-convex structure has a shape of causing no multiple reflection.

13. A projector comprising:
the illumination device according to claim 1;
a light modulation device adapted to modulate light emitted from the illumination device in accordance with image information to thereby form image light; and
a projection optical system adapted to project the image light.

14. A projector comprising:
the illumination device according to claim 2;
a light modulation device adapted to modulate light emitted from the illumination device in accordance with image information to thereby form image light; and
a projection optical system adapted to project the image light.

15. A projector comprising:
the illumination device according to claim 3;
a light modulation device adapted to modulate light emitted from the illumination device in accordance with image information to thereby form image light; and a projection optical system adapted to project the image light.

16. A projector comprising:

the illumination device according to claim 4;

a light modulation device adapted to modulate light emitted from the illumination device in accordance with image information to thereby form image light; and a projection optical system adapted to project the image light.

17. A projector comprising:

the illumination device according to claim 5;

a light modulation device adapted to modulate light emitted from the illumination device in accordance with image information to thereby form image light; and a projection optical system adapted to project the image light.

18. A projector comprising:

the illumination device according to claim 6;

a light modulation device adapted to modulate light emitted from the illumination device in accordance with image information to thereby form image light; and a projection optical system adapted to project the image light.

19. A projector comprising:

the illumination device according to claim 7;

a light modulation device adapted to modulate light emitted from the illumination device in accordance with image information to thereby form image light; and a projection optical system adapted to project the image light.

20. A projector comprising:

the illumination device according to claim 8;

a light modulation device adapted to modulate light emitted from the illumination device in accordance with image information to thereby form image light; and a projection optical system adapted to project the image light.

\* \* \* \* \*